US012392646B2

(12) United States Patent
Kiyomura (10) Patent No.: US 12,392,646 B2
(45) Date of Patent: Aug. 19, 2025

(54) DIAGNOSTIC APPARATUS AND DIAGNOSTIC METHOD FOR ROTATIONAL ANGLE SENSOR, AND CONTROL APPARATUS FOR ACTUATOR (71) Applicant: Hitachi Automotive Systems, Ltd., Hitachinaka (JP)

(72) Inventor: Akira Kiyomura, Isesaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 501 days.

(21) Appl. No.: 15/759,444

(22) PCT Filed: Jun. 14, 2017

(86) PCT No.: PCT/JP2017/021985
§ 371 (c)(1),
(2) Date: Mar. 12, 2018

(87) PCT Pub. No.: WO2017/217461
PCT Pub. Date: Dec. 21, 2017

(65) Prior Publication Data
US 2018/0259375 A1    Sep. 13, 2018

(30) Foreign Application Priority Data

Jun. 16, 2016  (JP) ................................. 2016-119756

(51) Int. Cl.
*G01D 18/00*    (2006.01)
*G01D 3/08*    (2006.01)
(Continued)

(52) U.S. Cl.
CPC ............... *G01D 18/00* (2013.01); *G01D 3/08* (2013.01); *G01D 5/12* (2013.01); *G01M 15/042* (2013.01); *G05B 23/0256* (2013.01); *G01D 5/204* (2013.01)

(58) Field of Classification Search
CPC ............ G01D 18/00; G01D 3/08; G01D 5/12; G01D 5/06; G01M 15/042; G05B 23/0256
(Continued)

(56) References Cited

U.S. PATENT DOCUMENTS 7,513,169 B2 * 4/2009 Noritou ................ G01D 5/2073
73/862.326
2001/0056333 A1 * 12/2001 Dietmayer ............... G01D 3/08
702/130
(Continued)

FOREIGN PATENT DOCUMENTS

JP    2002-276446 A    9/2002
JP    2007-206018 A    8/2007
(Continued)

OTHER PUBLICATIONS

Asada Atshuhisa, DE 60319045 T2, "Steering Angle Sensor For An Electric Power Steering", date published Feb. 5, 2009 (Year: 2009).*
(Continued)

*Primary Examiner* — John H Le
(74) *Attorney, Agent, or Firm* — Crowell & Moring LLP (57) ABSTRACT A diagnostic apparatus for a rotational angle sensor that outputs two correlated signals, corresponding to the rotational angle, obtains a reference value from the two correlated signals. Thereafter, the diagnostic apparatus for the rotational angle sensor diagnoses whether or not a failure has occurred in the rotational angle sensor based on whether or not a numerical value obtained from the two correlated signals is within a predetermined range including the reference value.

15 Claims, 8 Drawing Sheets (51) Int. Cl.
*G01D 5/12* (2006.01)
*G01D 5/20* (2006.01)
*G01M 15/04* (2006.01)
*G05B 23/02* (2006.01)

(58) Field of Classification Search
USPC .......................................................... 702/183
See application file for complete search history.

(56) References Cited

U.S. PATENT DOCUMENTS

| | | | |
|---|---|---|---|
| 2008/0052562 A1* | 2/2008 | Kameya | G01D 5/24466 714/47.1 |
| 2009/0206828 A1* | 8/2009 | Yamaura | G01B 7/30 324/207.25 |
| 2010/0131176 A1* | 5/2010 | Ide | F01L 13/0021 701/103 |
| 2014/0347040 A1* | 11/2014 | Kawase | G01D 5/2448 324/207.12 |
| 2015/0030104 A1* | 1/2015 | Jeon | G01P 3/489 375/296 |
| 2016/0252022 A1* | 9/2016 | Shinozaki | F02D 15/02 123/48 B |
| 2019/0265657 A1* | 8/2019 | Inagaki | G05B 23/024 |

FOREIGN PATENT DOCUMENTS

| | | |
|---|---|---|
| JP | 2012-98188 A | 5/2012 |
| JP | 2012-145488 A | 8/2012 |
| JP | 2015-81562 A | 4/2015 |
| JP | 2015-169464 A | 9/2015 |
| JP | 2015-169631 A | 9/2015 |
| JP | 2015-175734 A | 10/2015 |
| JP | 2015-210227 A | 11/2015 |

OTHER PUBLICATIONS

Extended European Search Report issued in counterpart European Application No. 17813356.7 dated Dec. 4, 2019 (nine (9) pages).
Japanese-language Office Action issued in counterpart Japanese Application No. 2016-119756 dated Mar. 5, 2019 with partial English translation (four pages).
Japanese-language Office Action issued in counterpart Japanese Application No. 2016-119756 dated May 7, 2019 with partial English translation (five (5) pages).
International Preliminary Report on Patentability (PCT/IB/326, PCT/IB/338 & PCT/IB/373) issued in PCT Application No. PCT/JP2017/021985 dated Dec. 27, 2018, including English translation of document C2 (Japanese-language Written Opinion (PCT/ISA/237)) previously filed on Mar. 12, 2018 (eight pages).
International Search Report (PCT/ISA/210) issued in PCT Application No. PCT/JP2017/021985 dated Aug. 1, 2017 with English translation (four pages).
Japanese-language Written Opinion (PCT/ISA/237) issued in PCT Application No. PCT/JP2017/021985 dated Aug. 1, 2017 (four pages).
European Office Action issued in European Application No. 17813356.7 dated Oct. 23, 2020 (eight (8) pages).

* cited by examiner

| ROTATIONAL ANGLE | $\theta_L$ | $\theta_L + \theta_0$ | $\theta_L + 2\theta_0$ | $\theta_L + 3\theta_0$ | ... |
|---|---|---|---|---|---|
| SUM OF SQUARES | $A_0$ | $A_1$ | $A_2$ | $A_3$ | ... |

| $\theta_L + (n-2)\theta_0$ | $\theta_L + (n-1)\theta_0$ | $\theta_L + n\theta_0$ | $\theta_H$ | $\theta_H$ |
|---|---|---|---|---|
| $A_{n-2}$ | $A_{n-1}$ | $A_n$ | $A_n$ | $A_n$ |

DIAGNOSTIC APPARATUS AND DIAGNOSTIC METHOD FOR ROTATIONAL ANGLE SENSOR, AND CONTROL APPARATUS FOR ACTUATOR

TECHNICAL FIELD

The present invention relates to a diagnostic apparatus and a diagnostic method for a rotational angle sensor, and a control apparatus for an actuator.

BACKGROUND ART

Regarding a rotational angle sensor, as disclosed in JP 2012-145488 A (Patent Document 1), a technique for diagnosing a failure in the rotational angle sensor based on whether or not a sum of a square of a sine wave signal (sin θ) and a square of a cosine wave signal (cos θ) corresponding to a rotational angle θ of a rotating body (i.e., $\sin^2 θ + \cos^2 θ$) is within a normal range, has been proposed.

REFERENCE DOCUMENT LIST

Patent Document

Patent Document 1: JP 2012-145488 A

SUMMARY OF THE INVENTION

Problem to be Solved by the Invention

However, a generating circuit and a processing circuit of a sine wave signal and a cosine wave signal of a rotational angle sensor include variation, which is inherent in each circuit, and therefore, the sum of squares of the sine and cosine wave signals does not always give a unique value ($\sin^2 θ + \cos^2 θ = 1$), even when the rotational angle sensor operates normally. Therefore, an upper threshold and a lower threshold defining the normal range, are set to values so as not to yield incorrect diagnosis considering the variations in the generating circuit and the processing circuit, and thus, the accuracy of failure diagnosis has not been good.

Thus, an object of the present invention is to provide a diagnostic apparatus and a diagnostic method for a rotational angle sensor, and to provide a control apparatus for an actuator, which improve accuracy of failure diagnosis.

Means for Solving the Problem

Therefore, according to the present invention, a diagnostic apparatus for a rotational angle sensor that outputs two correlated signals, corresponding to the rotational angle, obtains a reference value from the two correlated signals. Thereafter, the diagnostic apparatus for the rotational angle sensor diagnoses whether or not a failure has occurred in the rotational angle sensor based on whether or not a numerical value obtained from the two correlated signals is within a predetermined range including the reference value.

Moreover, according to the present invention, a control apparatus for an actuator that rotates a rotating body, the control apparatus controlling the actuator so that an output value of a rotational angle sensor that outputs two correlated signals, corresponding to a rotational angle of the rotating body, converges to a target angle, the control apparatus obtaining a reference value from the two correlated signals. Thereafter, the control apparatus for the actuator diagnoses whether or not a failure has occurred in the rotational angle sensor based on whether or not a numerical value obtained from the two correlated signals is within a predetermined range including the reference value.

Effects of the Invention

According to the present invention, it is possible to increase the accuracy of failure diagnosis of a rotational angle sensor.

MODE FOR CARRYING OUT THE INVENTION

Hereinbelow, an embodiment for implementing the present invention is described in detail with reference to the accompanying drawings.

Figure 1:
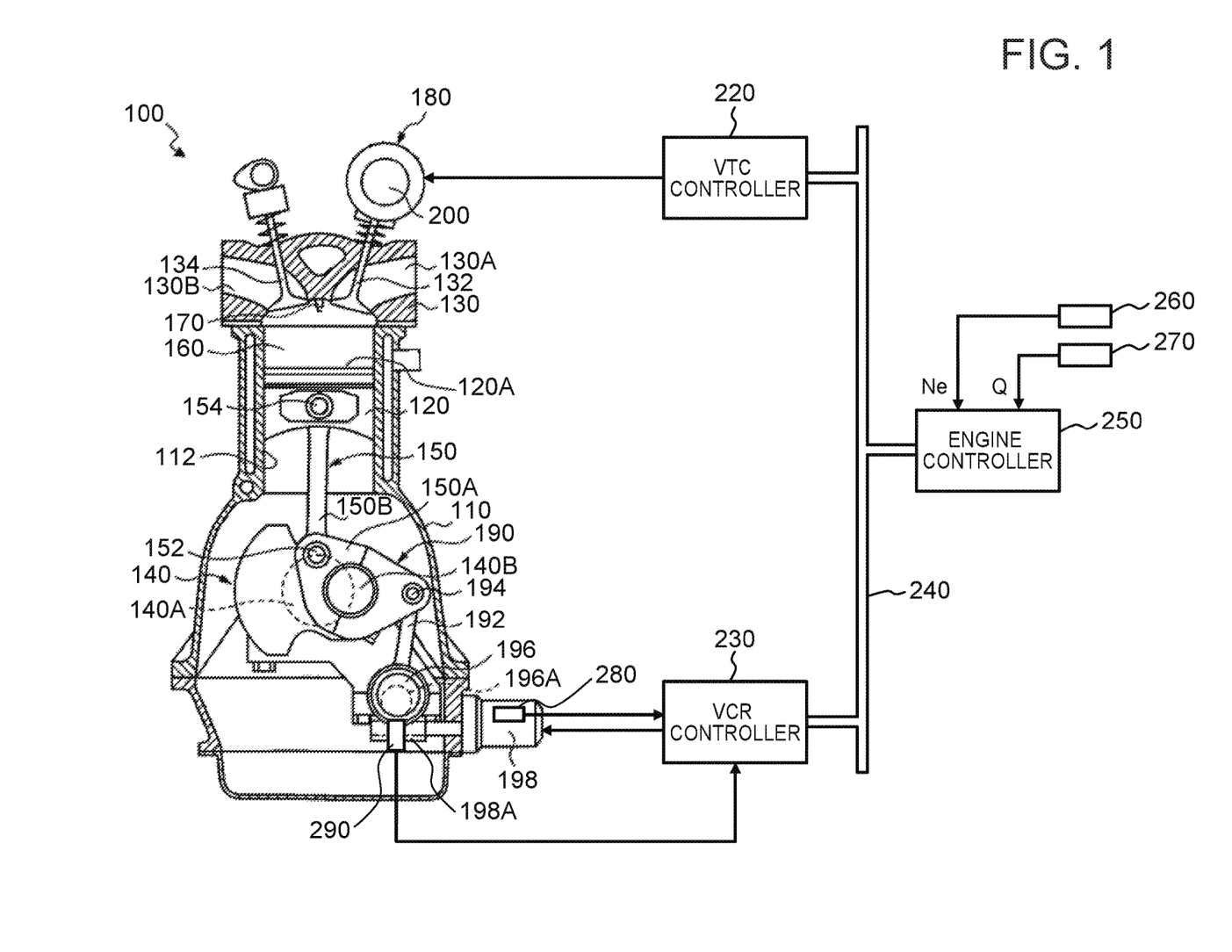
FIG. 1 is a system diagram illustrating an example of an internal combustion engine for use in a vehicle.

FIG. 1 illustrates an example of an internal combustion engine for use in a vehicle.

An internal combustion engine 100 includes a cylinder block 110, a piston 120 reciprocatably fitted in a cylinder bore 112 of cylinder block 110, a cylinder head 130 in which an intake port 130A and an exhaust port 130B are formed, and an intake valve 132 and an exhaust valve 134 that open and close opening ends of intake port 130A and exhaust port 130B.

Piston 120 is coupled to a crankshaft 140 via a con-rod (connecting rod) 150 including a lower link 150A and an upper link 150B. A combustion chamber 160 is formed between a top surface 120A of piston 120 and a lower surface of cylinder head 130. A spark plug 170 that ignites a mixture of fuel and air is attached to the approximate center of cylinder head 130 defining combustion chamber 160.

Furthermore, internal combustion engine 100 is provided with a variable valve timing (valve timing control, VTC) mechanism 180 that makes variable the phase of the open period of intake valve 132 relative to crankshaft 140, and a variable compression ratio (VCR) mechanism 190 that makes the compression ratio variable by changing the volume of combustion chamber 160.

For example, by changing the phase of an intake camshaft 200 relative to crankshaft 140 using an actuator, such as an electric motor, VTC mechanism 180 advances or retards the center phase of the operating angle of intake valve 132 while keeping the operating angle of intake valve 132 constant. But it is not limited to the phase of intake valve 132, and VTC mechanism 180 may make variable the phase of at least one of intake valve 132 and exhaust valve 134.

By changing the volume of combustion chamber 160 using a multi-link mechanism, for example, like one disclosed in JP 2002-276446 A, VCR mechanism 190 makes the compression ratio of internal combustion engine 100 variable. Hereinbelow, an example of VCR mechanism 190 will be described.

Crankshaft 140 includes a plurality of journal portions 140A and a plurality of crank pin portions 140B. Journal portions 140A are rotatably supported by a main bearing (not illustrated) of cylinder block 110. Crank pin portions 140B are eccentric from journal portions 140A, and lower link 150A is rotatably coupled to each of crank pin portions 140B. Upper link 150B has a lower end side pivotally coupled to one end of lower link 150A by a coupling pin 152 and has an upper end side pivotally coupled to piston 120 by a piston pin 154. A control link 192 has an upper end side pivotally coupled to the other end of lower link 150A by a coupling pin 194 and has a lower end side pivotally coupled to a lower portion of cylinder block 110 via a control shaft 196. Specifically, control shaft 196 is rotatably supported by the engine body (cylinder block 110) and has an eccentric cam portion 196A that is eccentric from the rotation center of control shaft 196, while a lower end side of control link 192 is rotatably fitted on eccentric cam portion 196A. The rotational position of control shaft 196 is controlled by a compression ratio control actuator 198 that uses an electric motor.

In VCR mechanism 190 using such a multi-link mechanism, when control shaft 196 is rotated by compression ratio control actuator 198, the center position of eccentric cam portion 196A, that is, the relative position to an engine body (cylinder block 110), changes. When the pivotal support position of the lower end of control link 192 is changed by this, the position of piston 120 at the piston top dead center (TDC) becomes higher or lower, so that the volume of combustion chamber 160 increases or decreases, to change the compression ratio of internal combustion engine 100. In this event, when the operation of compression ratio control actuator 198 is stopped, control link 192 is rotated relative to eccentric cam portion 196A of control shaft 196 by reciprocating motion of piston 120, so that the compression ratio shifts to the low compression ratio side.

Figure 2:
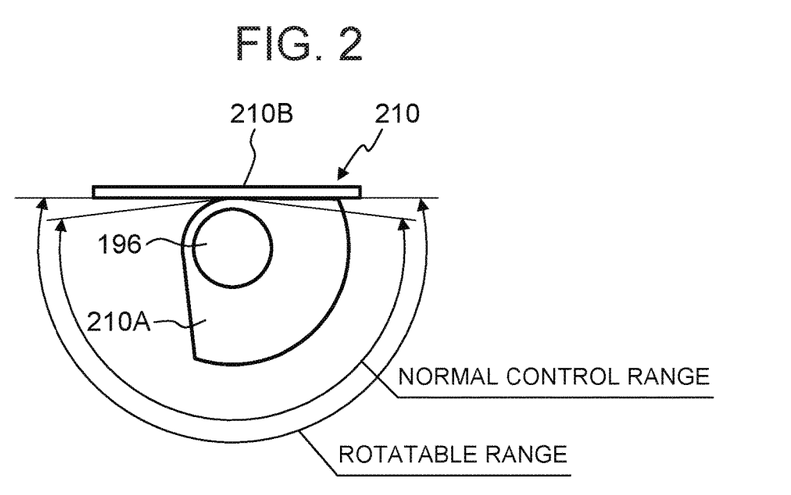
FIG. 2 is a partial enlarged view illustrating an example of a stopper mechanism.

As illustrated in FIG. 2, a stopper mechanism 210, which restricts the displacement (rotation) of control shaft 196 when control shaft 196 is rotated beyond a normal control range, is attached to VCR mechanism 190. Stopper mechanism 210 includes a substantially fan-shaped first member 210A, the pivot portion of which is secured to control shaft 196, and a plate-shaped second member 210B secured to cylinder block 110. First member 210A rotates integrally with control shaft 196. When control shaft 196 rotates beyond a maximum compression ratio (upper limit) or a minimum compression ratio (lower limit), defining the normal control range, second member 210B comes in contact with one of two sides defining the central angle of first member 210A, so as to restrict the displacement of control shaft 196, which is one example of a mechanism member. Herein, since stopper mechanism 210 functions when control shaft 196 has exceeded the normal control range, first member 210A and second member 210B do not come in contact with each other in normal control, so that, for example, it is possible to reduce the occurrence of abnormal noise or the like. Stopper mechanism 210 may be used not only for restricting the displacement of control shaft 196, but also for learning a reference position of control shaft 196.

Stopper mechanism 210 is sufficient if it can restrict the displacement on at least one of the maximum compression ratio side and the minimum compression ratio side with respect to the rotation of control shaft 196. Furthermore, stopper mechanism 210 is sufficient if it can restrict the displacement of control shaft 196 by at least two members, and such two members are not limited to substantially fan-shaped first member 210A and plate-shaped second member 210B, and may have other shapes.

VTC mechanism 180 and VCR mechanism 190 are electronically controlled by a VTC controller 220 and a VCR controller 230, respectively, each incorporating a processor such as a microcomputer. VTC controller 220 and VCR controller 230 are connected to an engine controller 250, incorporating a processor such as a microcomputer and configured to electronically control internal combustion engine 100, via, for example, a controller area network (CAN) 240 being one example of an in-vehicle network. Therefore, freely chosen data can be sent and received via CAN 240 between VTC controller 220, VCR controller 230, and engine controller 250. The in-vehicle network is not limited to CAN 240, and any known network such as FlexRay (registered trademark) may be used.

To engine controller 250, output signals of a rotation speed sensor 260 that measures rotational speed Ne of internal combustion engine 100, and a load sensor 270 that measures load Q of internal combustion engine 100 are input, as examples of operating states of internal combustion engine 100. Herein, as load Q of internal combustion engine 100, a state quantity closely related to the torque, such as intake negative pressure, intake flow rate, supercharging pressure, accelerator opening degree, throttle opening degree, or the like, may be used. For example, engine controller 250 refers to maps in which target values matching rotational speeds and loads are set, and calculates a target angle of VTC mechanism 180 and a target compression ratio of VCR mechanism 190 corresponding to rotational speed Ne and load Q of internal combustion engine 100, respectively. Then, engine controller 250 sends the target angle and the target compression ratio to VTC controller 220 and VCR controller 230, respectively, via CAN 240. Output signals read by engine controller 250 are not limited to the output signals of rotation speed sensor 260 and load sensor 270, and engine controller 250 may read rotational speed Ne and load Q of internal combustion engine 100 from an additional controller (not illustrated) connected via CAN 240.

VTC controller 220 having received the target angle performs feedback control of a drive current to be output to an actuator of VTC mechanism 180 such that a real angle (actual angle) measured by a sensor (not illustrated) converges to the target angle. VCR controller 230 having received the target compression ratio performs feedback control of a drive current to be output to compression ratio control actuator 198 of VCR mechanism 190 such that a real compression ratio (actual compression ratio) that is measured by a compression ratio sensor described below converges to the target compression ratio. By doing this, VTC mechanism 180 and VCR mechanism 190 are controlled to the target values corresponding to the operation state of internal combustion engine 100.

The compression ratio sensor that measures an actual compression ratio of internal combustion engine 100 includes: a relative angle sensor 280 that measures a relative angle of an output shaft of compression ratio control actuator 198; and an absolute angle sensor 290 that measures an absolute angle of control shaft 196 coupled to the output shaft of compression ratio control actuator 198 via a speed reducer 198A. Using an output value of absolute angle sensor 290 at the start-up of the engine as a reference point, VCR controller 230 obtains a rotational angle of control shaft 196, that is, the compression ratio of internal combustion engine 100, from an output value of relative angle sensor 280. This is because relative angle sensor 280 has high resolution whereas, for example, it cannot distinguish between 0° and 360° of the same phase, and absolute angle sensor 290 can obtain an absolute angle of control shaft 196, although it has low resolution.

Figure 3:
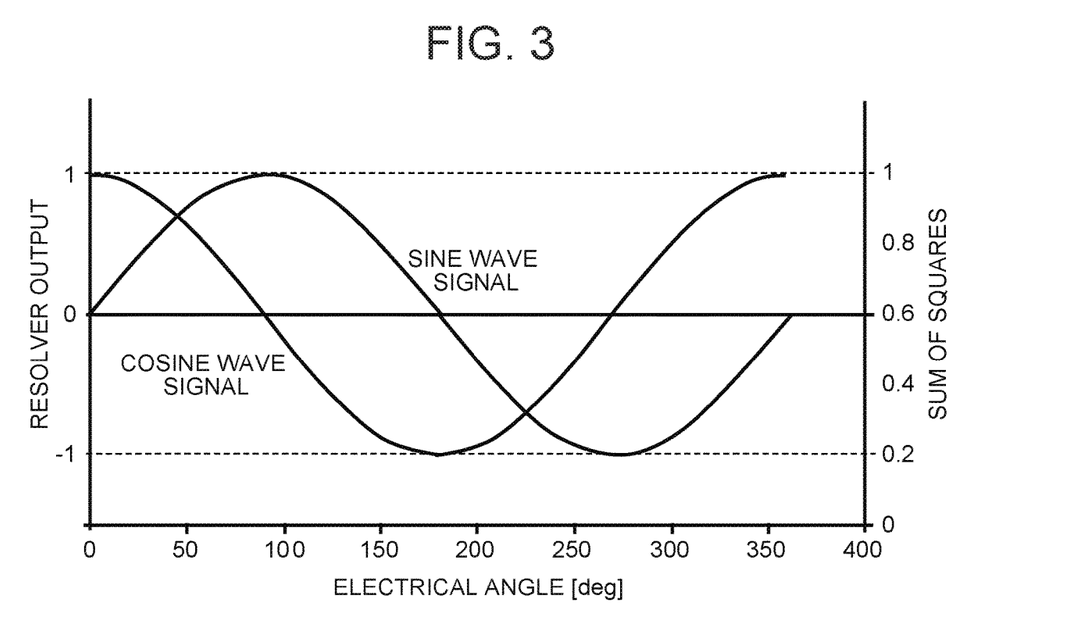
FIG. 3 is an explanatory view illustrating an example of a resolver output.

Each of relative angle sensor 280 and absolute angle sensor 290 includes a resolver, or the like, that outputs two correlated signals, corresponding to a rotational angle of a rotating body, more specifically, outputs a sine wave signal and a cosine wave signal. For example, the resolver includes a rotor that integrally rotates with the rotating body, and a stator with one phase of an exciting coil wound thereon and two phases of output coils wound thereon. When an alternating voltage is applied to the exciting coil of the stator, a two-phase voltage with a sine wave signal and a cosine wave signal, which change in response to the rotational angle (electric angle) of the rotating body, is generated in each output coil, as illustrated in FIG. 3. VCR controller 230 can obtain the rotational angle of the rotating body by calculating an arctangent of the sine and cosine wave signals output from the resolver. In the following description, the rotational angle obtained from the two signals of relative angle sensor 280 is referred to as "output value of relative angle sensor 280" and the rotational angle obtained from the two signals of absolute angle sensor 290 is referred to as "output value of absolute angle sensor 290".

Herein, variations in the generating circuit and the processing circuit of the sine wave signal and the cosine wave signal of the resolver will be described.

Figure 4:
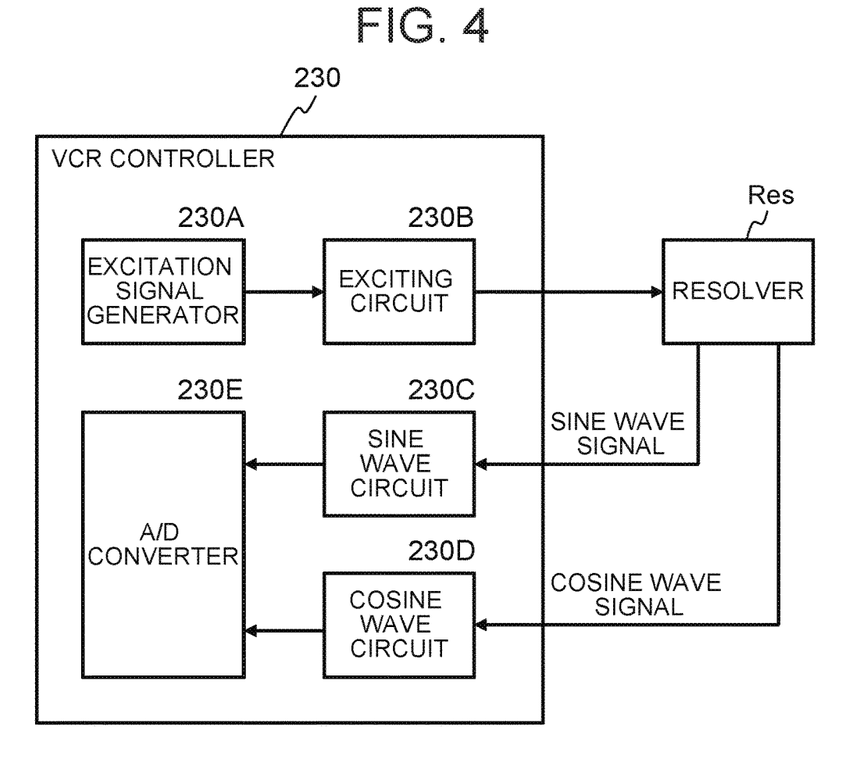
FIG. 4 is a configuration view illustrating a generating circuit and a processing circuit of a sine wave signal and a cosine wave signal.

VCR controller 230 has an excitation signal generator 230A, an exciting circuit 230B, a sine wave circuit 230C, a cosine wave circuit 230D, and an A/D converter 230E as illustrated in FIG. 4. Excitation signal generator 230A generates an excitation signal containing a sine wave (alternating) of a predetermined frequency, for example. Exciting circuit 230B amplifies the excitation signal from excitation signal generator 230A, and then applies the amplified excitation signal to the exciting coil of a resolver Res. Sine wave circuit 230C shapes the sine wave signal output from the output coil of resolver Res, and then outputs the shaped sine wave signal to A/D converter 230E. Cosine wave circuit 230D shapes the cosine wave signal output from the output coil of resolver Res, and then outputs the shaped cosine wave signal to A/D converter 230E. A/D converter 230E converts the sine wave signal and the cosine wave signal output from sine wave circuit 230C and cosine wave circuit 230D into digital signals.

Then, VCR controller 230 reads the sine wave signal and the cosine wave signal, which have been converted into the digital signals by A/D converter 230E, and then calculates the arctangent thereof to thereby obtain the rotational angle of the rotating body and also diagnoses whether or not a failure has occurred in resolver Res based on the sum of squares of these two signals. At this time, the sum of squares of the sine and cosine wave signals include a variation of excitation signal generator 230A, a variation of exciting circuit 230B, a variation of resolver Res, variations of sine wave circuit 230C and cosine wave circuit 230D, and a variation of A/D converter 230E as individual variations. Moreover, the sum of squares of the sine and cosine wave signals includes a variation due to the temperature characteristics in each circuit, an eccentric variation due to degradation and wear of the rotor, and the like, as non-reproducible variations, for example.

Figure 5:
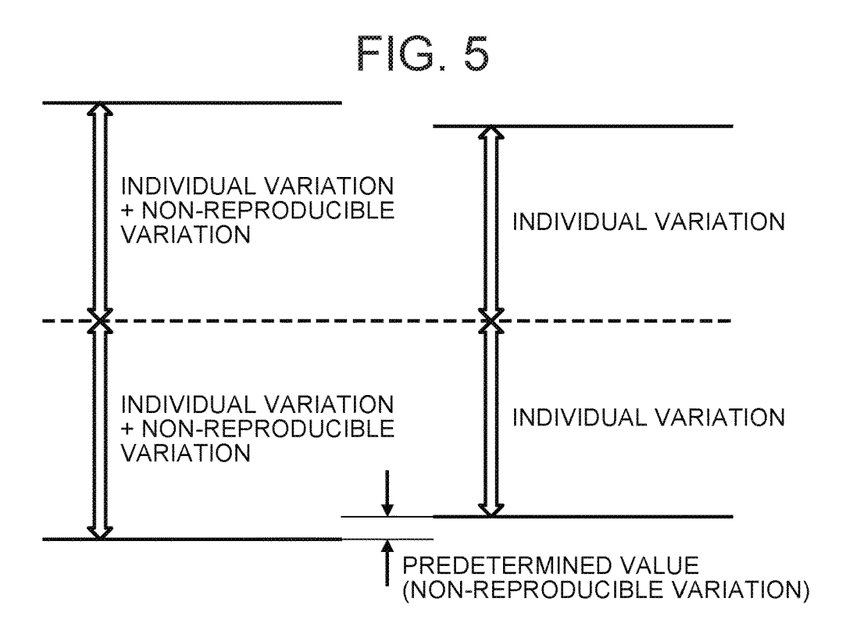
FIG. 5 is an explanatory view of variations included in a sum of squares of the sine and cosine wave signals.

When "individual variation+non-reproducible variation" is compared with "individual variation" as illustrated in FIG. 5 with respect to the variations of the sum of squares of the sine and cosine wave signals, the "individual variation" occupies the largest part of the variations. Therefore, when the sum of squares of the sine and cosine wave signals output from the resolver is calculated as an initialization process of VCR controller 230, a reference value (learning value) including only the individual variation can be obtained. Then, by considering the non-reproducible variation to the reference value, the threshold values (upper threshold and lower threshold) for failure diagnosis can be obtained.

For example, VCR controller 230 learns each of the reference values for failure diagnosis after a learning flag to be output from a diagnostic tool connected to CAN 240 changes from LOW to HI in a vehicle assembling factory. More specifically, VCR controller 230 changes the compression ratio of internal combustion engine 100 to the low compression ratio side, and control shaft 196 is brought into a state in which the displacement to the low compression ratio side is restricted by stopper mechanism 210. Then, VCR controller 230 changes the compression ratio of internal combustion engine 100 to the high compression ratio side, and then learns the sum of squares of the sine and cosine wave signals output from resolver Res as the reference value at each predetermined angle $\theta_0$ until the displacement of control shaft 196 to the high compression ratio side is restricted by stopper mechanism 210. The reference values may be referred to in the subsequent control, and therefore may be written in a table in a nonvolatile memory, such as flash ROM (read only memory).

Figure 6:
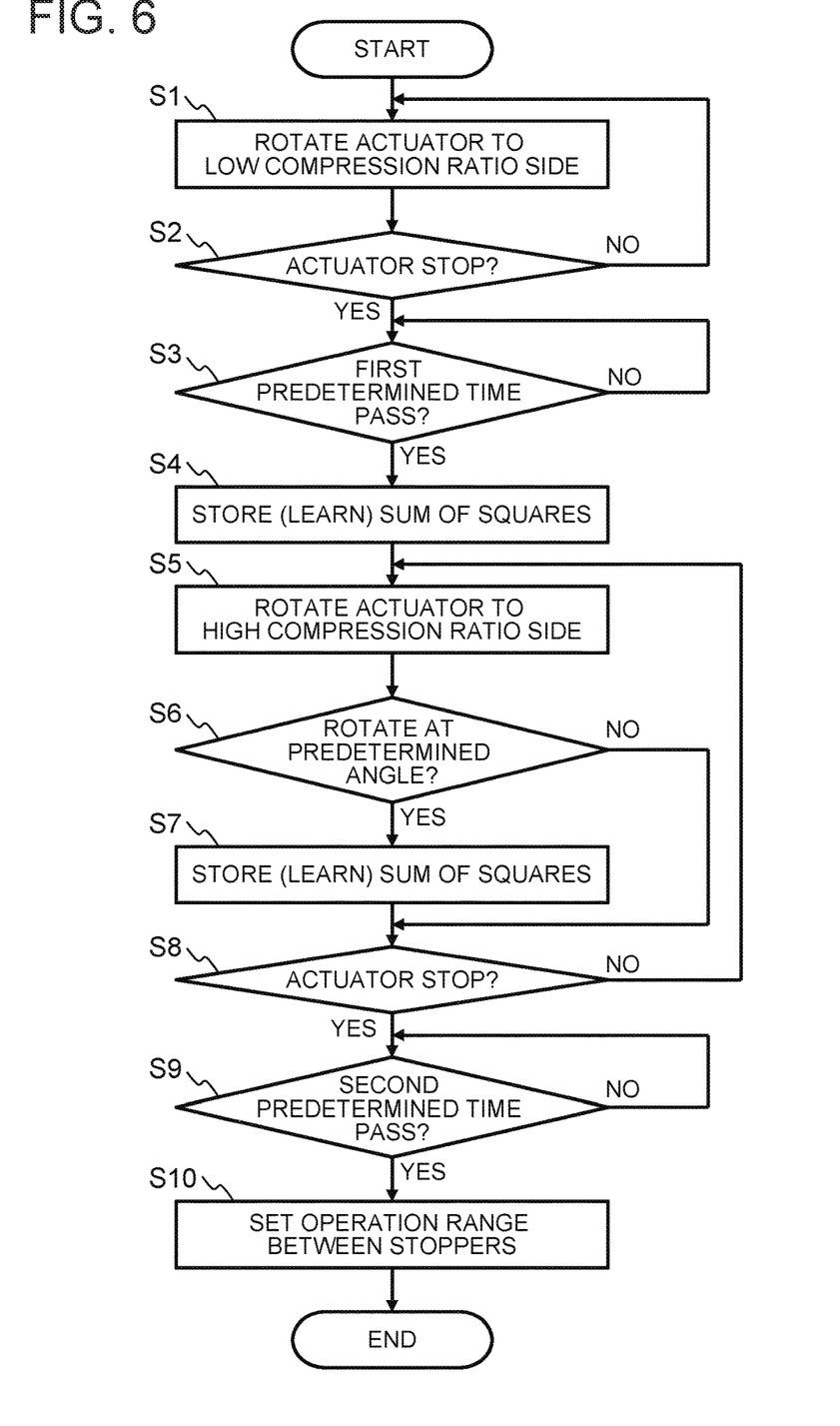
FIG. 6 is a flowchart illustrating an example of learning processing of a reference value.

FIG. 6 illustrates an example of a learning process of a reference value executed by the processor of VCR controller 230 according to a control program stored in a nonvolatile memory. The learning process can also be executed during self shutdown after a vehicle travels for a predetermined time or for a predetermined distance, for example, as well as after the learning flag of a diagnostic tool changes from LOW to HI. Although the following description is given provided that a failure of absolute angle sensor 290 is diagnosed, a failure of relative angle sensor 280 may also be diagnosed by the same process.

In step 1 (abbreviated as "S1" in FIG. 6; the same applies hereinafter), the processor of VCR controller 230 outputs a drive signal to compression ratio control actuator 198 of VCR mechanism 190, for example, to thereby rotate compression ratio control actuator 198 so that the compression ratio of internal combustion engine 100 is changed to the low compression ratio side. At this time, the processor of VCR controller 230 controls the rotation of compression ratio control actuator 198 by speed feedback control, for example (the same applies hereinafter).

In step 2, the processor of VCR controller 230 determines whether or not compression ratio control actuator 198 has stopped based on whether or not an output value of relative angle sensor 280 has changed, for example. When compression ratio control actuator 198 has stopped, first member 210A of stopper mechanism 210 comes in contact with second member 210B, so that the displacement of control shaft 196 to the low compression ratio side is restricted.

Then, when the processor of VCR controller 230 determines that compression ratio control actuator 198 has stopped, the process proceeds to step 3 (Yes), whereas when the processor of VCR controller 230 determines that compression ratio control actuator 198 does not stop, the process returns to step 1 (No).

In step 3, the processor of VCR controller 230 determines whether or not first predetermined time has passed after compression ratio control actuator 198 has stopped utilizing a built-in timer function, for example. Herein, the first predetermined time is time for securing time until the displacement of control shaft 196 to the low compression ratio side is certainly restricted and can be set as appropriate based on the output characteristics of compression ratio control actuator 198, the reduction ratio of decelerator 198A, and the like. Then, when the processor of VCR controller 230 determines that the first predetermined time has passed, the process proceeds to step 4 (Yes), whereas when the processor of VCR controller 230 determines that the first predetermined time does not pass, the process waits (No).

Figure 7:
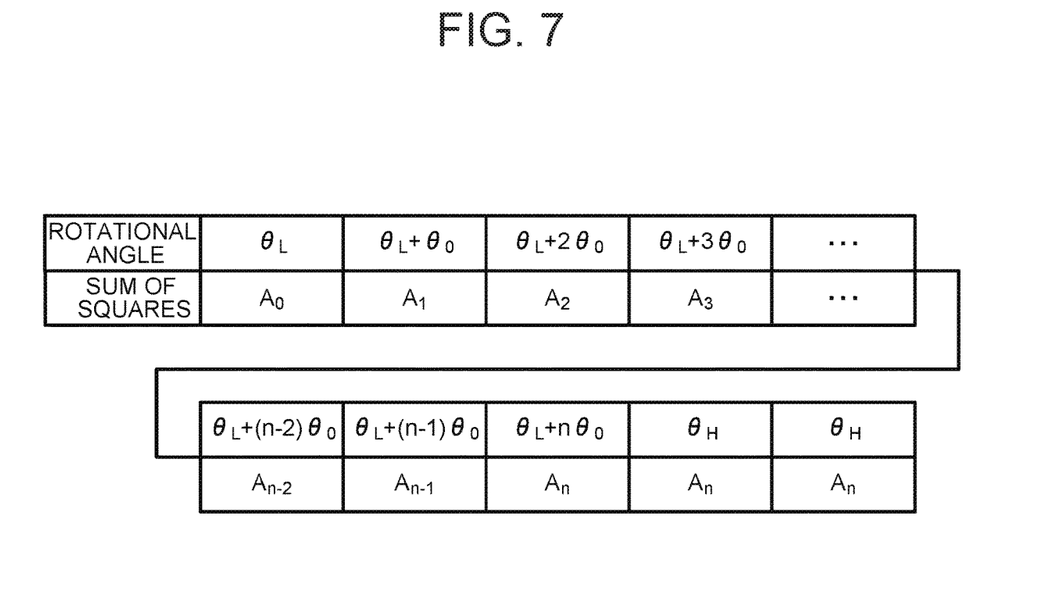
FIG. 7 is an explanatory view of a table storing the sum of squares of the sine and cosine wave signals.

In step 4, the processor of VCR controller 230 obtains the sum of squares of a sine wave signal and a cosine wave signal output from absolute angle sensor 290. Then, the processor of VCR controller 230 writes the sum of squares in association with the output value (rotational angle) of absolute angle sensor 290 in the table in the nonvolatile memory as illustrated in FIG. 7. In short, the processor of VCR controller 230 stores (learns) the rotational angle at which the displacement of control shaft 196 to the low compression ratio side is restricted and the sum of squares in association.

In step 5, the processor of VCR controller 230 outputs a drive signal to compression ratio control actuator 198 of VCR mechanism 190, for example, whereby compression ratio control actuator 198 is rotated so that the compression ratio of internal combustion engine 100 is changed to the high compression ratio side.

In step 6, the processor of VCR controller 230 reads an output value of absolute angle sensor 290, for example, and then determines whether or not control shaft 196 has rotated by a multiple of the predetermined angle $\theta_0$ based on the state in which the displacement of control shaft 196 to the low compression ratio side is restricted. Herein, the predetermined angle $\theta_0$ can be set as appropriate based on the output characteristics of absolute angle sensor 290, the demanded accuracy, and the like, for example. Then, when the processor of VCR controller 230 determines that control shaft 196 has rotated by a multiple of the predetermined angle $\theta_0$, the process proceeds to step 7 (Yes), whereas when the processor of VCR controller 230 determines that control shaft 196 does not rotate by a multiple of the predetermined angle $\theta_0$, the process proceeds to step 8 (No).

In step 7, the processor of VCR controller 230 obtains the sum of squares of the sine and cosine wave signals output from absolute angle sensor 290. Then, the processor of VCR controller 230 successively writes the sum of squares in association with the output value (rotational angle) of absolute angle sensor 290 in the table in a nonvolatile memory as illustrated in FIG. 7. In short, the processor of VCR controller 230 stores (learns) the rotational angle of control shaft 196 and the sum of squares in association at each predetermined angle from the state in which the displacement of control shaft 196 to the low compression ratio side is restricted.

In step 8, the processor of VCR controller 230 determines whether or not compression ratio control actuator 198 has stopped based on whether or not an output value of relative angle sensor 280 has changed, for example. When compression ratio control actuator 198 has stopped, first member 210A of stopper mechanism 210 comes in contact with second member 210B, so that the displacement of control shaft 196 to the high compression ratio side is restricted. Then, when the processor of VCR controller 230 determines that compression ratio control actuator 198 has stopped, the process proceeds to step 9 (Yes), whereas when the processor of VCR controller 230 determines that compression ratio control actuator 198 does not stop, the process returns to step 5 (No).

In step 9, the processor of VCR controller 230 determines whether or not second predetermined time has passed after compression ratio control actuator 198 has stopped utilizing a built-in timer function, for example. Herein, the second predetermined time is time for securing time until the displacement of control shaft 196 to the high compression ratio side is certainly restricted and can be set as appropriate based on the output characteristics of compression ratio control actuator 198, the reduction ratio of decelerator 198A, and the like. The second predetermined time may be the same as the first predetermined time, or alternatively, may be different from the first predetermined time. Then, when the processor of VCR controller 230 determines that the second predetermined time has passed, the process proceeds to step 10 (Yes), whereas when the processor of VCR controller 230 determines that the second predetermined time does not pass, the process waits (No).

Since the restricted position to the high compression ratio side may not be a multiple of the predetermined angle, the output value (rotational angle) of absolute angle sensor 290 and the sum of squares may be written in the table in the nonvolatile memory in the state in which the displacement of control shaft 196 to the high compression ratio side is restricted. Moreover, when the table in the nonvolatile memory has free space, the output value of absolute angle sensor 290 and the sum of squares which are finally stored may be written.

In step 10, the processor of VCR controller 230 sets the operation range defined by the state in which the displacement to the low compression ratio side is restricted and the state in which the displacement to the high compression ratio is restricted as the operation range of control shaft 196, and then the processor writes the same in the nonvolatile memory. The operation range can prevent control shaft 196 from rotating beyond the operation range, for example, and can contribute to a reduction in heat generation amount, power consumption, and the like of compression ratio control actuator 198.

Figure 8:
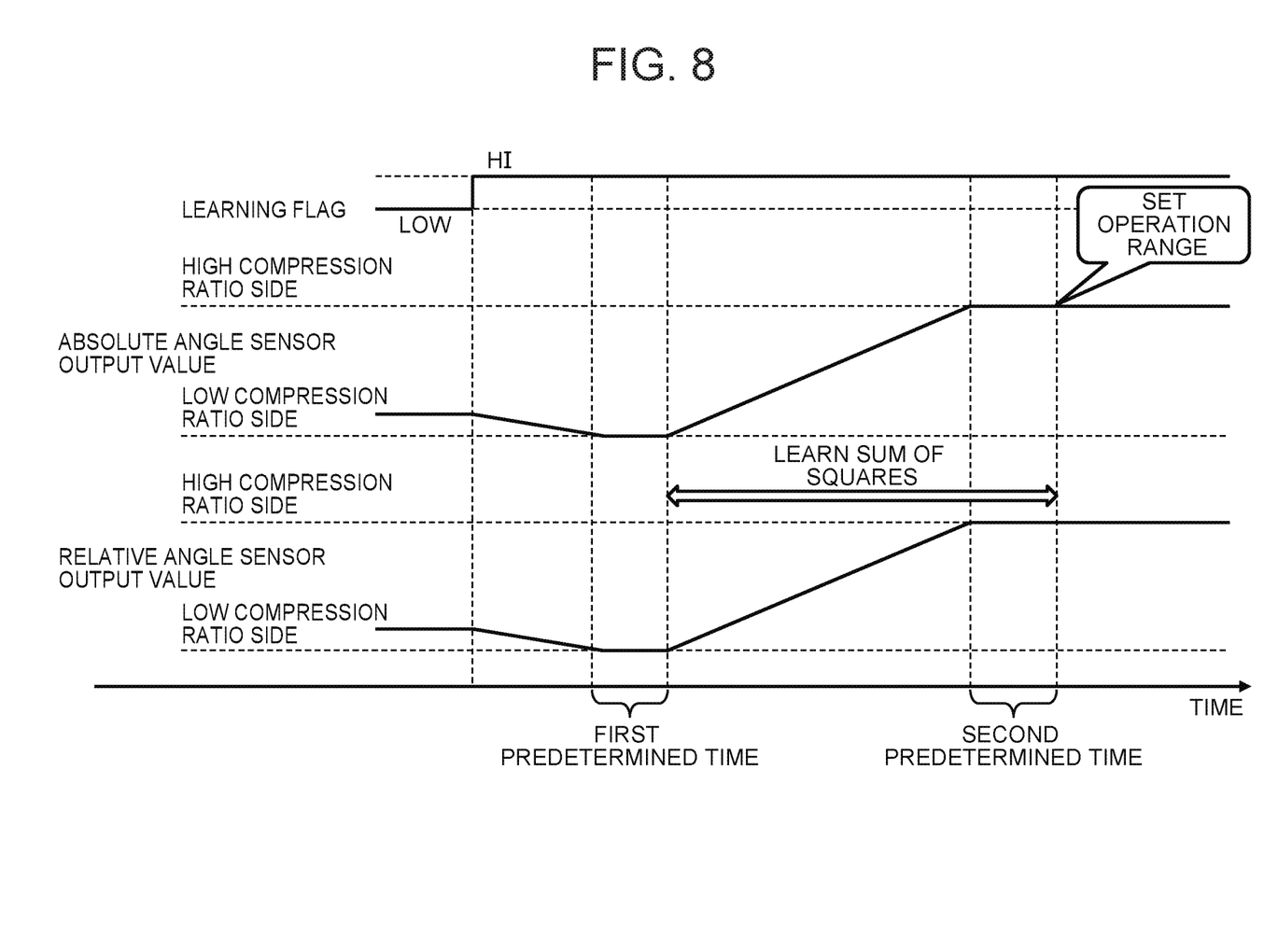
FIG. 8 is a timing chart illustrating an example of learning processing.

As illustrated in FIG. 8, according to such a learning process, when the learning flag output from a diagnostic tool changes from LOW to HI, control shaft 196 of VCR mechanism 190 rotates to the low compression ratio side, and then the output value of each of relative angle sensor 280 and absolute angle sensor 290 begins to gradually change toward the restricted position on the low compression ratio side. When the first predetermined time has passed in a state in which, as a result of the fact that control shaft 196 has changed toward the restricted position on the low compression ratio side, first member 210A of stopper mechanism 210 comes in contact with second member 210B, so that the displacement to the low compression ratio side is restricted, control shaft 196 of VCR mechanism 190 begins to rotate to the high compression ratio side.

Then, the output value of each of relative angle sensor 280 and absolute angle sensor 290 begins to gradually change toward the restricted position on the high compression ratio side with the rotation of control shaft 196. In the process of changing from the restricted position on the low compression ratio side to the restricted position on the high compression ratio side, the sum of squares of the sine and cosine wave signals output from absolute angle sensor 290 is obtained whenever control shaft 196 rotates at a predetermined angle, and then stored in the table in the nonvolatile memory in a state of being associated with the output value of absolute angle sensor 290. When second predetermined time has passed in a state in which, as a result of the fact that control shaft 196 has changed toward the restricted position on the high compression ratio side, first member 210A of stopper mechanism 210 comes in contact with second member 210B, so that the displacement to the high compression ratio side is restricted, the operation range of compression ratio control actuator 198 is set.

In the table in the nonvolatile memory, the rotational angle and the sum of squares are written in association in response to directions from the outside at a vehicle assembling factory, and the like. Therefore, it is thought that, when the environments of a vehicle assembling factory and the like are uniformly managed, only the individual variations of absolute angle sensor 290 are included in the sum of squares to be written in the table. Therefore, a failure can be diagnosed referring to the table in the nonvolatile memory based on the sum of squares stored therein as the reference value.

Figure 9:
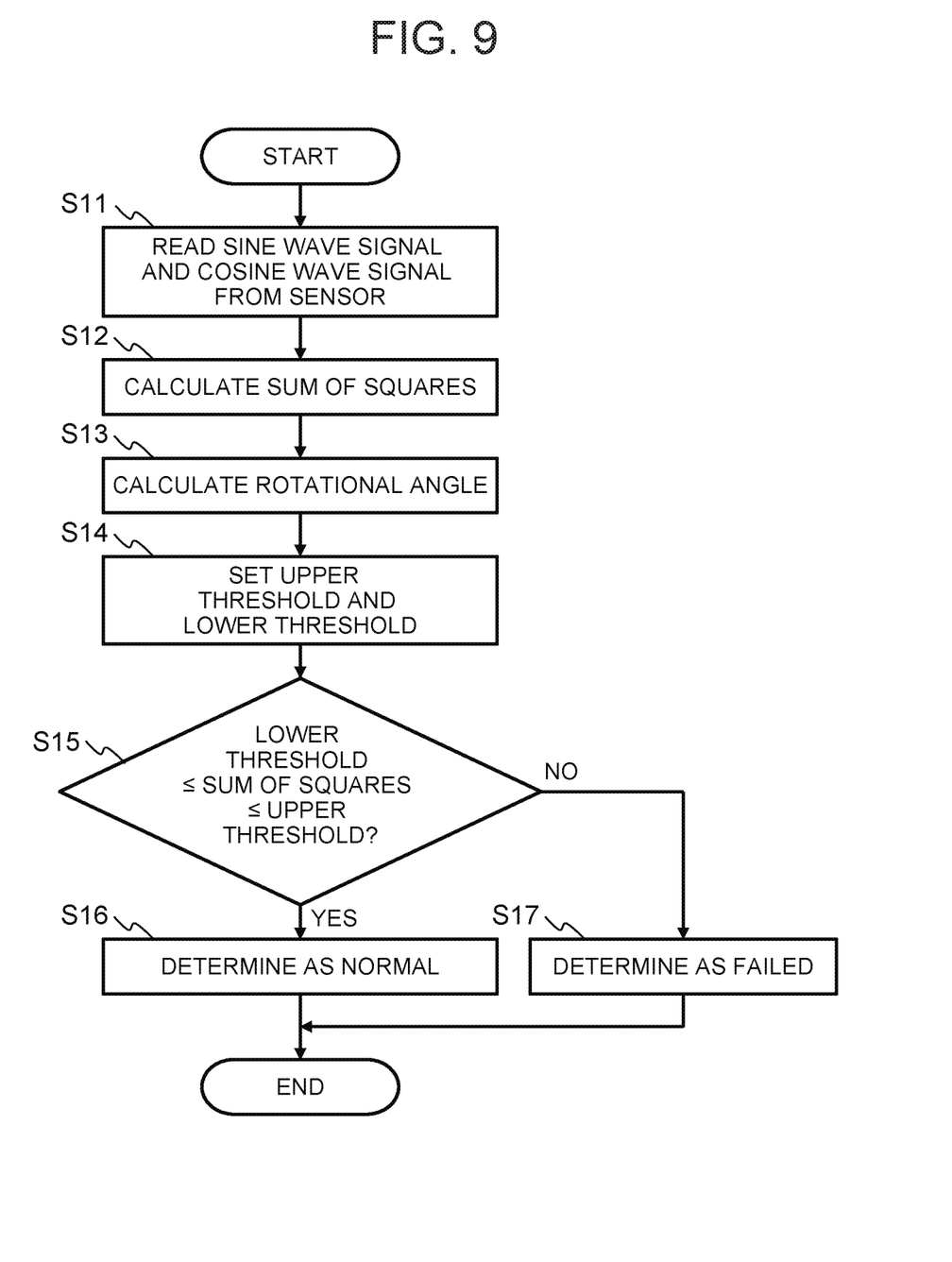
FIG. 9 is a flowchart illustrating an example of a failure diagnosis process.

FIG. 9 illustrates an example of a failure diagnosis process of absolute angle sensor 290 to be executed by the processor of VCR controller 230 according to a control program stored in the nonvolatile memory after the learning process has been completed.

In step 11, the processor of VCR controller 230 reads a sine wave signal and a cosine wave signal from absolute angle sensor 290.

In step 12, the processor of VCR controller 230 calculates a sum of squares of the sine and cosine wave signals.

In step 13, the processor of VCR controller 230 obtains the rotational angle of control shaft 196 by calculating the arctangent of the sine wave signal and the cosine wave signal.

In step 14, the processor of VCR controller 230 sets the upper threshold and the lower threshold for diagnosing a failure referring to the table in the nonvolatile memory. More specifically, the processor of VCR controller 230 obtains the sum of squares (reference value) associated with the rotational angle of control shaft 196 referring to the table in the nonvolatile memory. Then, the processor of VCR controller 230 calculates a predetermined ratio (for example, 15%) of the sum of squares, sets the same as a predetermined value, and then adds to or subtracts from the sum of squares the predetermined value to thereby set the upper threshold and the lower threshold. The processor of VCR controller 230 may be set the upper threshold and the lower threshold by multiplying the sum of squares by different predetermined ratios (for example, 1.15 and 0.85) or adding to or subtracting from the sum of squares a constant value (fixed value). In short, the processor of VCR controller 230 sets the predetermined range including the sum of squares considering the non-reproducible variations.

In step 15, the processor of VCR controller 230 determines whether or not the sum of squares is greater than or equal to the lower threshold and less than or equal to the upper threshold, in short, whether or not the sum of squares is within the normal range (predetermined range). Then, when the processor of VCR controller 230 determines that the sum of squares is greater than or equal to the lower threshold and less than or equal to the upper threshold, the process proceeds to step 16 (Yes), whereas when the processor of VCR controller 230 determines that the sum of squares is not greater than or equal to the lower threshold or not less than or equal to the upper threshold, the process proceeds to step 17 (No).

In step 16, the processor of VCR controller 230 determines that absolute angle sensor 290 is normal.

In step 17, the processor of VCR controller 230 determines that absolute angle sensor 290 has failed.

Figure 10:
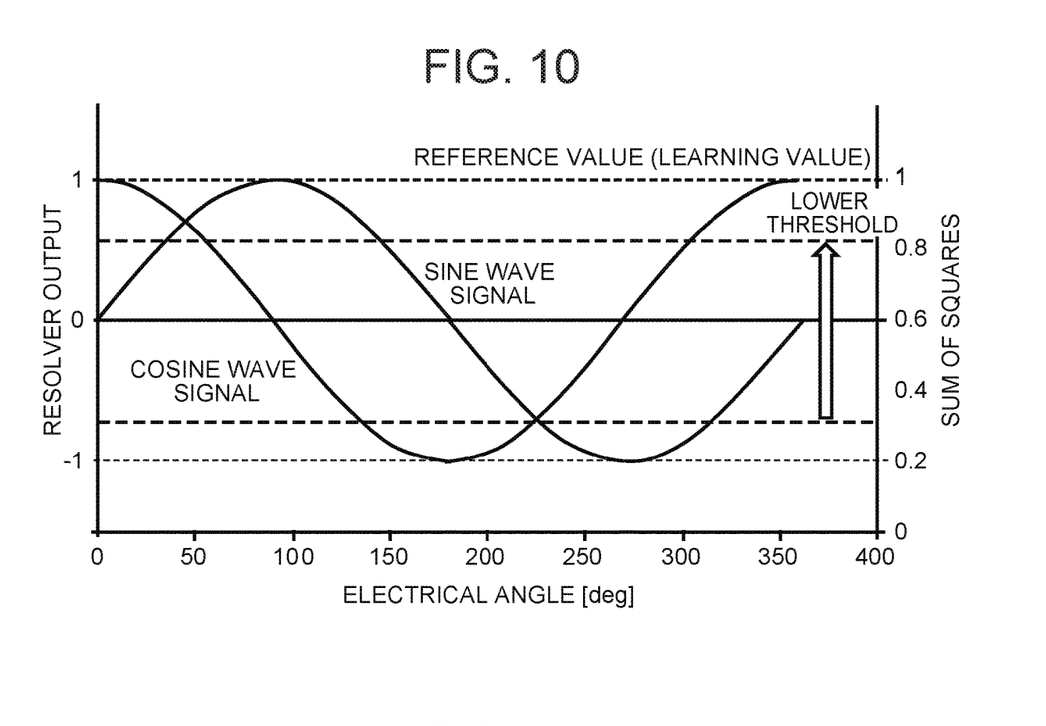
FIG. 10 is an explanatory view of a threshold value for diagnosing a failure of an absolute angle sensor.

According to the failure diagnosis process, the threshold value for diagnosing a failure of absolute angle sensor 290 is obtained by considering the non-reproducible variations to the reference value which includes only the individual variations. Therefore, as illustrated in FIG. 10, the lower threshold for diagnosing a failure of absolute angle sensor 290 becomes greater than a value set so as not to cause wrong diagnosis and the frequency of diagnosing that a failure has occurred in absolute angle sensor 290 can be increased. The same applies to the upper threshold for diagnosing a failure of absolute angle sensor 290. Then, when the sum of squares of the sine and cosine wave signals output from absolute angle sensor 290 exceeds the threshold value, it is diagnosed that a failure has occurred in absolute angle sensor 290. On the other hand, unless the sum of squares of the sine and cosine wave signals output from absolute angle sensor 290 exceeds the threshold value, it is diagnosed that absolute angle sensor 290 is normal. Therefore, the accuracy of failure diagnosis of absolute angle sensor 290 can be improved.

Figure 11:
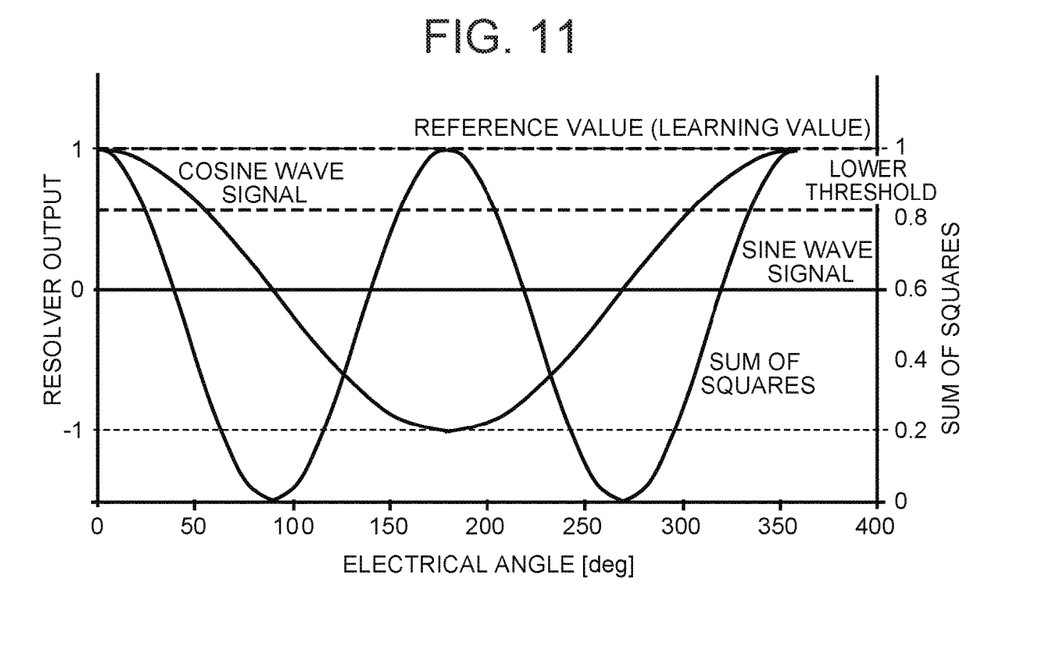
FIG. 11 is an explanatory view of the sum of squares when a sine wave signal becomes abnormal.

In absolute angle sensor 290, when the output coil outputting a sine wave signal develops a short circuit, the sine wave signal always represents zero, as illustrated in FIG. 11. In this case, the sum of squares of the sine and cosine wave signals appears to be a cosine wave form that changes in half the period of the cosine wave signal, as illustrated in FIG. 11. Since the range of the threshold value defined by the upper threshold and the lower threshold is narrowed, even when the output coil outputting a sine wave signal develops a short circuit, the short circuit can be diagnosed at an early stage. Moreover, even when it is erroneously diagnosed that a failure has occurred due to overlapping of noise or the like, then it is diagnosed that absolute angle sensor 290 is normal at an early stage. Therefore, for example, a fail-safe operation transited due to the occurrence of a failure can be canceled and the function of VCR mechanism 190 which is a control target system can be demonstrated.

When diagnosing that a failure has occurred in absolute angle sensor 290, the processor of VCR controller 230 may output a control signal to compression ratio control actuator 198 of VCR mechanism 190, to cause the transition to a fail-safe operation, in which the compression ratio of an internal combustion engine is changed to the lowest compression ratio. Moreover, when diagnosing that a failure has occurred in absolute angle sensor 290, the processor of VCR controller 230 may shift an output value of absolute angle sensor 290 into the range defined by the upper threshold and the lower threshold at a freely chosen timing (for example, while the engine is stopped).

Although, in the above embodiment, a method of diagnosing a failure of relative angle sensor 280 and absolute angle sensor 290, serving as a rotational angle sensor, has been described, the rotational angle sensor may be any angle sensor that uses a resolver or the like. Furthermore, although the processor of VCR controller 230 plays a major role in diagnosing a failure of the rotational angle sensor, this is not limited thereto, and any processor for failure diagnosis, any processor of another controller, a dedicated circuit, or the like, may be used.

REFERENCE SYMBOL LIST

230 VCR controller
280 Relative angle sensor
290 Absolute angle sensor
Res Resolver

The invention claimed is:

1. A diagnostic apparatus comprising:
a processor operatively coupled to a rotational angle sensor and that outputs two correlated signals, corresponding to a rotational angle,
wherein the processor is configured to diagnose whether or not a failure has occurred in the rotational angle sensor based on whether or not a numerical value obtained from the two correlated signals is within a predetermined range including a reference value obtained from the two correlated signals beforehand, and
the reference value is obtained during a learning process, during which multiple values of the reference value are measured, the multiple values including a lowermost value and an uppermost value, the lowermost value and the uppermost value defining the predetermined range, wherein
the reference value is obtained at each predetermined angle during the learning process,
the lowermost value is smaller than the uppermost value,
the predetermined range is obtained by taking a variation due to temperature characteristics, or a variation due to degradation into account, and
the processor is configured to diagnose that the rotational angle sensor is normal when the numerical value is within the predetermined range, whereas processor diagnoses that a failure has occurred in the rotational angle sensor when the numerical value is out of the predetermined range.

2. The diagnostic apparatus for the rotational angle sensor, according to claim 1, wherein the two correlated signals are a sine wave signal and a cosine wave signal.

3. The diagnostic apparatus for the rotational angle sensor, according to claim 2, wherein each of the reference value and the numerical value is a sum of squares of the sine and cosine wave signals.

4. The diagnostic apparatus for the rotational angle sensor, according to claim 1, wherein the predetermined range has a width that is a predetermined ratio of the reference value.

5. The diagnostic apparatus for the rotational angle sensor, according to claim 1, wherein the rotational angle sensor measures a rotational angle of a control shaft or an actuator of a variable compression ratio mechanism that makes a compression ratio of an internal combustion engine variable.

6. The diagnostic apparatus for the rotational angle sensor, according to claim 1, wherein the rotational angle sensor is a resolver comprising a rotor that rotates integrally with a rotating body, and a stator with one phase of an exciting coil and two phases of output coils.

7. The diagnostic apparatus for the rotational angle sensor according to claim 1, wherein the reference value is obtained at each predetermined angle during a learning process, such that the reference value is variable based on the angle.

8. A diagnostic method of a rotational angle sensor, comprising the steps of:
operatively coupling a processor to a rotational angle sensor;
obtaining, with the processor two correlated signals, corresponding to a rotational angle, a reference value from the two correlated signals; and then
diagnosing, with the processor, whether or not a failure has occurred in the rotational angle sensor based on whether or not a numerical value obtained from the two signals is within a predetermined range including the reference value, wherein
the reference value is obtained during a learning process, during which multiple values of the reference value are measured, the multiple values including a lowermost value and an uppermost value, the lowermost value and the uppermost value defining the predetermined range,
the reference value is obtained at each predetermined angle during the learning process,
the lowermost value is smaller than the uppermost value,
the predetermined range is obtained by taking a variation due to temperature characteristics, or a variation due to degradation into account, and
the processor is configured to diagnose that the rotational angle sensor is normal when the numerical value is within the predetermined range, whereas processor diagnoses that a failure has occurred in the rotational angle sensor when the numerical value is out of the predetermined range.

9. The diagnostic method of the rotational angle sensor, according to claim 8, wherein the two signals are a sine wave signal and a cosine wave signal.

10. The diagnostic method of the rotational angle sensor, according to claim 9, wherein each of the reference value and the numerical value is a sum of squares of the sine and cosine wave signals.

11. A system comprising:
an actuator;
a rotational angle sensor; and
a processor operatively coupled to the rotational angle sensor and to the actuator, wherein the actuator is configured to rotate a rotating body, the processor is configured to control the actuator so that an output value of the rotational angle sensor that outputs two correlated signals, corresponding to a rotational angle of the rotating body, converges to a target angle,
wherein the processor is configured to diagnose whether or not a failure has occurred in the rotational angle sensor based on whether or not a numerical value obtained from the two correlated signals is within a predetermined range including a reference value obtained from the two correlated signals beforehand, wherein
the reference value is obtained during a learning process, during which multiple values of the reference value are measured, the multiple values including a lowermost value and an uppermost value, the lowermost value and the uppermost value defining the predetermined range,
the reference value is obtained at each predetermined angle during the learning process,
the lowermost value is smaller than the uppermost value,
the predetermined range is obtained by taking a variation due to temperature characteristics, or a variation due to degradation into account, and the processor is configured to diagnose that the rotational angle sensor is normal when the numerical value is within the predetermined range, whereas processor diagnoses that a failure has occurred in the rotational angle sensor when the numerical value is out of the predetermined range.

12. The control apparatus for the actuator, according to claim 11, wherein the processor is configured to switch the actuator to a fail-safe operation when the processor diagnoses that a failure has occurred in the rotational angle sensor.

13. The control apparatus for the actuator, according to claim 11, wherein the processor is configured to shift an output value of the rotational angle sensor into the predetermined range at a freely chosen timing when the processor diagnoses that a failure has occurred in the rotational angle sensor.

14. The control apparatus for the actuator, according to claim 11, wherein the rotating body is a control shaft of a variable compression ratio mechanism that makes a compression ratio of an internal combustion engine variable.

15. The control apparatus for the actuator, according to claim 14, wherein the reference value is obtained in an operation range of a stopper mechanism that restricts rotation to a low compression ratio side and to a high compression ratio side of the control shaft.

* * * * *